United States Patent
Eslambolchi et al.

[11] Patent Number: 5,949,947
[45] Date of Patent: Sep. 7, 1999

[54] METHOD AND APPARATUS FOR CABLE SHEATH REPAIR

[75] Inventors: Hossein Eslambolchi, Basking Ridge, N.J.; John Sinclair Huffman, McDonough, Ga.; James F. Kirkpatrick, Conyers, Ga.; Claywell D. Turley, Covington, Ga.

[73] Assignee: AT & T Corp, New York, N.Y.

[21] Appl. No.: 08/976,799

[22] Filed: Nov. 24, 1997

[51] Int. Cl.$^6$ ............................................. G02B 6/00
[52] U.S. Cl. .................. 385/134; 385/99; 156/94; 264/36.19; 264/36.22; 174/77 R
[58] Field of Search ........................... 385/86, 99, 100, 385/134–139; 156/94; 174/76, 77 R, 88 R, 116; 264/36.19, 36.22

[56] References Cited

U.S. PATENT DOCUMENTS

| | | | |
|---|---|---|---|
| 4,218,417 | 8/1980 | Jacquemart | 264/36.19 |
| 4,441,017 | 4/1984 | Sorlien | 219/528 |
| 4,497,760 | 2/1985 | Sorlien | 264/36.19 |
| 4,682,513 | 7/1987 | Reeder | 206/223 |
| 4,699,460 | 10/1987 | Szentesi | 385/134 |
| 4,732,628 | 3/1988 | Dienes | 156/48 |
| 4,767,893 | 8/1988 | Ball et al. | 174/84 R |

Primary Examiner—Hemang Sanghavi
Attorney, Agent, or Firm—Robert B. Levy

[57] ABSTRACT

Repair of a damaged portion of a cable sheath may be effected with the aid of a sheath repair kit comprised of an enclosure (10) and a volume of encapsulant (36). The enclosure (10) includes first and second members (12), both having an interior axially extending channel in communication with openings ($20_1$ and $20_2$) in ends of the respective member to receive the damaged cable portion in the channel. The second member is shorter than the first member and has a cross-section smaller in area than that of the channel in the first member to enable receipt of the second member in the channel of the first member. In this way, the first and second members will capture the damaged portion of the cable, as well as a volume of the encapsulant (36) added to the channel of the first member to immerse the damaged cable portion.

16 Claims, 2 Drawing Sheets

METHOD AND APPARATUS FOR CABLE SHEATH REPAIR

TECHNICAL FIELD

This invention relates to an apparatus for repairing a sheath fault on a cable and a method for using the apparatus to effect such a repair.

BACKGROUND ART

Many providers of telecommunications services, such as AT&T, maintain large networks of buried fiber-optic cables. Each fiber optic cable typically comprises a High Density Polyethylene (HDPE) jacket that encompasses a metallic sheath surrounding one or more individual fibers. The HDPE jacket protects the sheath and the fiber of the cable both during and after burial underground. During the burial process, the HDPE jacket may become nicked or scratched, thereby exposing the metallic sheath through the jacket. Such minor nicks or scratches often go undetected. However, exposure of the cable sheath through a nick or scratch in the HDPE jacket often leads to sheath damage from electrolysis. Eventually, the sheath may become severely damaged, preventing the sheath from radiating a cable locating tone impressed thereon for the purpose of locating the cable. Once the sheath becomes so damaged that the sheath no longer radiates the cable locating tone, then the cable owner must effect a repair.

Presently, a field technician effects a repair by excavating the cable and then wrapping the damaged portion of the HDPE jacket with electrical tape or a fiber-impregnated cloth strip to cover the exposed sheath. Many times, a repair effected in this manner does not last long, requiring a subsequent repair, causing the cable owner additional effort and expense.

Thus, there is a for a technique for effecting a long-lasting repair of the HDPE jacket of a cable.

BRIEF SUMMARY OF THE INVENTION

Briefly, the present invention provides a technique for effecting a substantially permanent and long lasting repair of the damaged jacket of a cable. To effect a repair in accordance with the invention, a technician makes use of a repair kit that includes a first and second elongated members, each typically a parallelepiped having generally orthogonal sides and ends. Both the first and second members have an axially extending channel in communication with an opening in each member's respective ends. Initially, the technician positions the first member to receive the damaged portion of the cable in that member's channel. After receipt of the cable, the technician adds a non-water soluble gel in the channel of the first member to seal the damaged jacket portion of the cable. Thereafter, the technician presses the second elongated member, which is shorter and has a has a cross-section smaller than the channel in the first member, into the channel of the first member. Once the second member is pressed into the channel of the first member, at least one catch on the second member engages a corresponding latch on the first member. In this way, the first and second members become locked to each other, thereby capturing the damaged portion of the cable, now surrounded by the encapsulant, between the two members.

DETAILED DESCRIPTION

Figure 1:
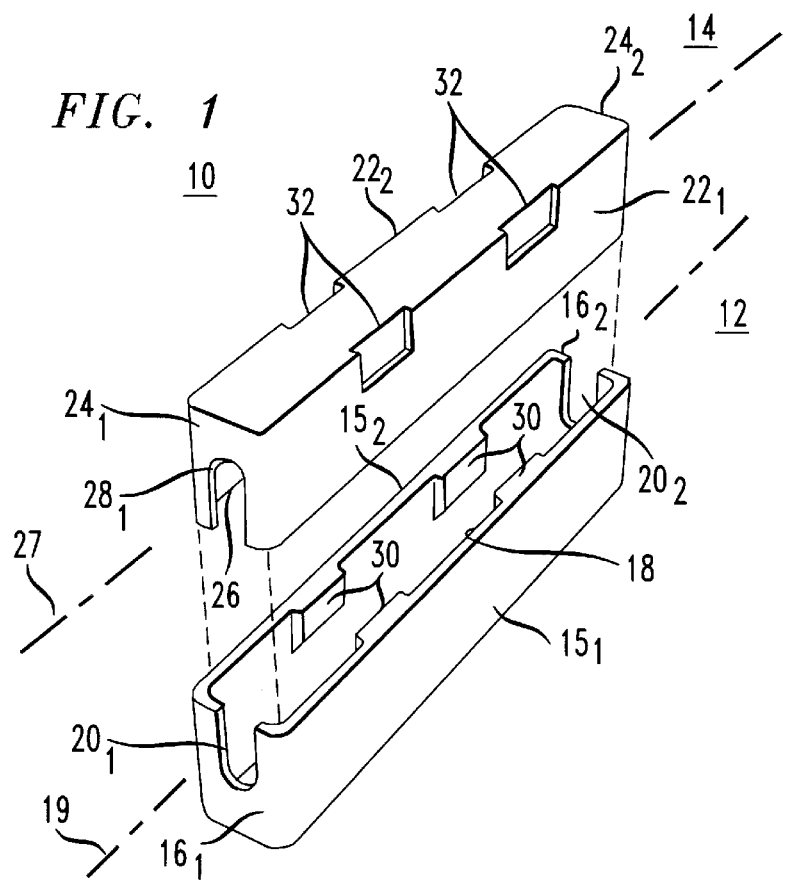
FIG. 1 shows the first and second members of a sheath repair kit in accordance with the present invention.

FIG. 1 depicts a perspective view of a sheath repair enclosure 10 in accordance with a preferred embodiment of the invention for facilitating a sheath repair. The enclosure 10 includes first and second elongated members 12 and 14, respectively, each typically fabricated from High Density Polyethylene (HDPE) plastic or a similar inert material that is substantially impervious to water and other elements present below ground. In practice, the member 12 comprises a parallelepiped, having generally rectangular sides $15_1$ and $15_2$ and ends $16_1$ and $16_2$, the ends and sides being substantially orthogonal to each other. The member 12 is generally hollow, having an interior channel 18 that extends generally parallel to the major axis 19 of the member. The channel 18 communicates with each of a pair of "U-shaped" openings $20_1$ and $20_2$ in the ends $16_1$ and $16_2$, respectively.

The member 14 also typically comprises a parallelepiped, having generally rectangular sides $22_1$ and $22_2$ and ends $24_1$ and $24_2$, the ends and sides being substantially orthogonal to each other. Like the member 12, the member 14 is generally hollow, having an interior channel 26 that extends generally parallel to the major axis 27 of the member. The channel 26 communicates with each of a pair of "U-shaped" openings in the member ends $24_1$ and $24_2$, respectively, only the opening $28_1$ in the end $24_1$ shown in FIG. 1.

Figure 2:
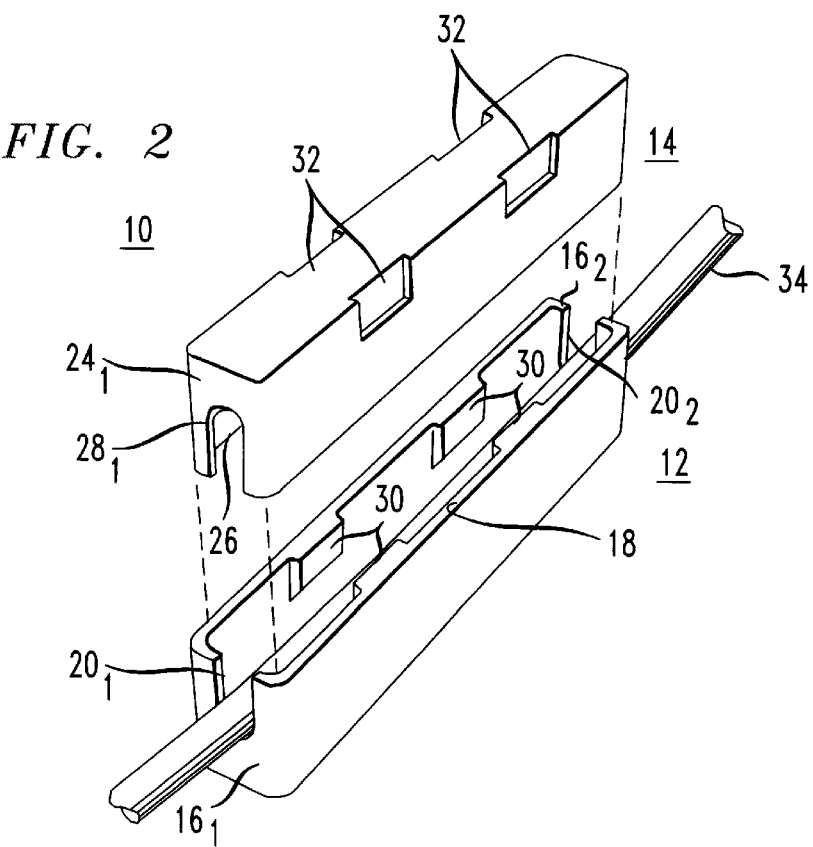
FIG. 2 shows the first and second members of the sheath repair kit of FIG. 1, with the first member in receipt of a damaged portion of a cable.
Figure 3:
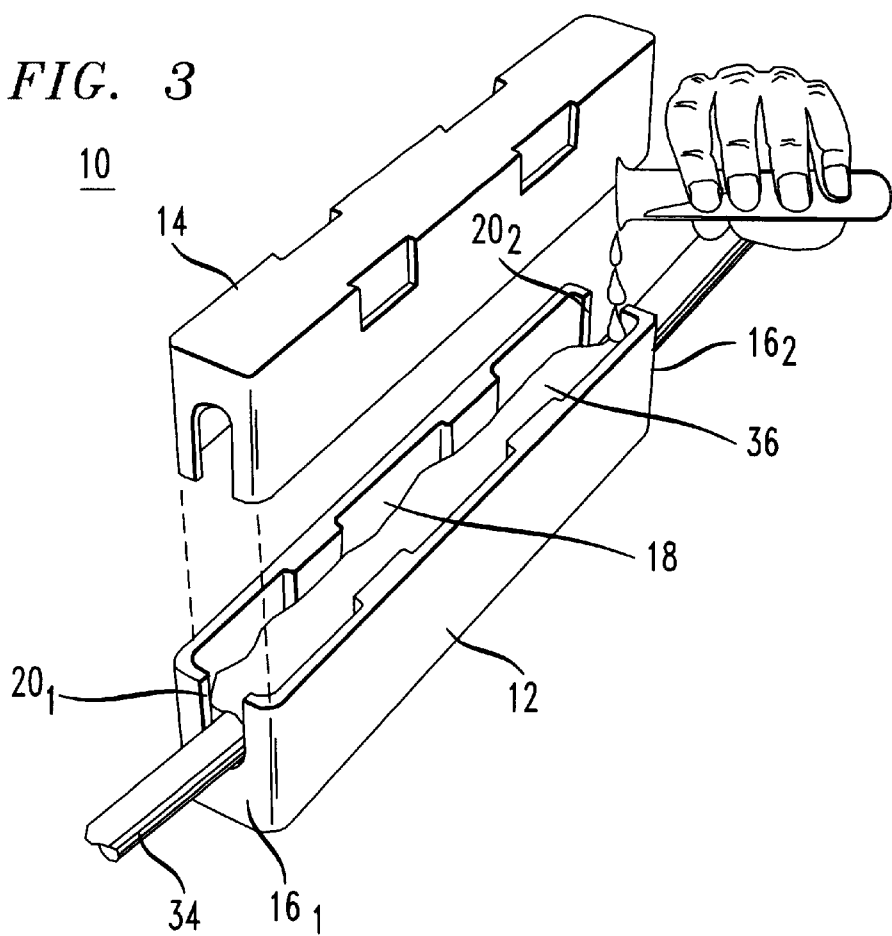
FIG. 3 shows the first and second members of the sheath repair kit of FIG. 2, with the first member undergoing filling with a non-water-soluble gel.
Figure 4:
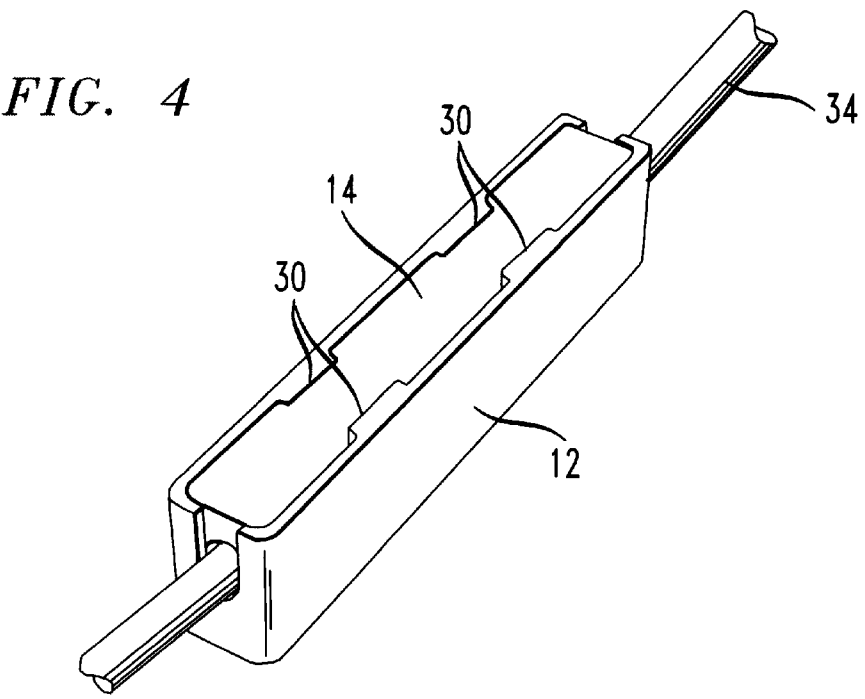
FIG. 4 shows the first and second members of the sheath repair kit of FIG. 1, with the second member latched within the first member.

The member 14 is shorter in length than the member 12. Also, the member 14 has a cross-section smaller in area than that of the member 12. In this way, the member 14 can fit within the channel 18 of the member 12 as seen in FIG. 4. To retain the member 14 within the channel 18, the member 12 includes at least a pair of catches 30-30, typically comprised of opposing protrusions on the interior surfaces of the sides $15_1$ and $15_2$, respectively as seen in FIGS. 1–3. Each catch 30 extends horizontally outward from its corresponding side into the channel 18 directly towards the opposing catch on the interior surface of the opposite member side. In practice, the member 12 includes two spaced-apart catches 30-30 on the interior surface of each of the member sides $15_1$ and $15_2$, respectively. Each of the catches 30-30 within the channel 18 of the member 12 serves to engage a separate one of latches 32-32 on the member 14. Each latch 32 takes the form of a recesses on a corresponding one of the sides $22_1$ and $22_2$ of the member 14 sized to receive an associated one of the catches 30-30, when the member 14 is pressed into the member 12 as seen in FIG. 4.

FIGS. 2–4 illustrate, in sequence, the steps of a method for effecting repair of a damaged portion of a cable 34 (see FIG. 2) utilizing the sheath repair enclosure 10 of FIG. 1. To effect such a repair, a technician excavates the damaged portion of the cable 34 and places the damaged portion in the channel 18 of the member 12 so that the cable passes through the openings $20_1$ and $20_2$ in the sides $16_1$ and $16_2$, respectively, of the member 12. After placing the damaged portion of the cable 34 in the channel 18 of the member 12, the technician fills at least a portion of the channel 18 with a non-water soluble gel 36, such as Q-Tel 2055 encapsulant, manufactured by Chem Pue, Indianapolis, Ind., as seen in FIG. 3. Other types non-water soluble encapsulants may be used for this purpose. In practice, the technician adds a sufficient amount of encapsulant 36 to submerse the damaged portion of the cable 34, but not enough to completely fill the channel 18 which would cause excessive leakage of encapsulant 36 through the openings $20_1$ and $20_1$ in the ends $16_1$ and $16_2$ upon placement of member 14 in the channel 18.

After adding the encapsulant 36, as seen in FIG. 3, the technician then presses the member 14 into the channel 18 of member 12 as seen in FIG. 4 to cause the catches 30-30 of the member 12 to engage the latches on the member 14 (not show in FIG. 4), thereby locking the member 12 to the member 14. In this way, the damaged portion of the cable 34, as well as the encapsulant 36 in which the damaged portion is immersed, remain permanently captured between the members 12 and 14. Finally, the damaged portion of the cable 34, now protected by the encapsulant 36 and surrounded by the members 12 and 14, is re-buried.

Effecting a repair of the a damaged section of sheath on the cable 34 with the repair enclosure 10 and a volume of encapsulant 36 (together representing a sheath repair kit) affords several advantages. First, the enclosure 10 of FIG. 1 facilitates a much quicker repair than is achieved by wrapping the damaged portion of the cable 34 with electrical tape or a fiber-impregnated cloth strip. Moreover, the repair effected by the enclosure 10 is permanent and prevents future damage to the cable 34, preventing unnecessary risk to the cable created by subsequent repairs as often required by past repair techniques.

The above-described embodiments are merely illustrative of the principles of the invention. Those skilled in the art may make various modifications and changes which will embody the principles of the invention and fall within the spirit and scope thereof. For example, while the above method and apparatus has been described with respect to buried cables, the method and apparatus are equally efficacious for non-buried cables as well.

What is claimed is:

1. A method for effecting repair of a damaged portion of a cable, comprising the steps of:

placing the damaged portion of a cable in an axially extending channel of a first elongated member having opposite ends, each with an opening in communication with the channel so that the cable extends through the openings;

filling at least a portion of the channel in first member with a non-water soluble gel to submerse the damaged portion of the cable;

inserting into the channel of the first member a second elongated member having a cross section smaller in area than that of the channel in the first member, the second member having an axially extending channel in communication with an opening in opposite ends of the second member sized to receive the damage portion of the cable upon receipt of the second member in the first member; and locking the second member to the first member to capture the damaged portion of the cable and the encapsulant between the first and second members.

2. The method according to claim 1 wherein the first member is locked to the second member by engaging each of a plurality of catches within the channel of the first member with a corresponding one of a plurality of latches on the second member.

3. A method for effecting repair of a damaged portion of a buried cable, comprising the steps of:

excavating the damaged portion of the buried cable;

placing the damaged portion of a cable in an axially extending channel of a first elongated member having opposite ends, each with an opening in communication with the channel so that the cable extends through the openings;

filling at least a portion of the channel in first member with a non-water soluble gel to submerse the damaged portion of the cable;

inserting into the channel of the first member a second elongated member having a cross section smaller in area than that of the channel in the first member, the second member having an axially extending channel in communication with an opening in opposite ends of the second member sized to receive the damage portion of the cable upon receipt of the second member in the first member;

locking the second member to the first member to capture the damaged portion of the cable and the encapsulant between the first and second members;

re-burying the damaged portion of the cable, now captured between the first and second members.

4. The method according to claim 3 wherein the first member is locked to the second member by engaging each of a plurality of catches within the channel of the first member with a corresponding one of a plurality of latches on the second member.

5. A repair enclosure for enclosing a sheath fault of a cable, comprising a first elongated member having opposite ends, each with an opening in communication with a channel extending in the member along its major axis to receive a damaged portion of the cable to enable the cable to extend through the openings;

a second elongated member having opposite ends, each with an opening in communication with a channel extending in the second member along its major axis to receive a damaged portion of the cable to enable the cable to extend through the openings; the second member of a length shorter than, and having a cross-section of an area smaller than that of the channel of the first member to enable receipt of the second member in the channel of the first member;

at least one latch on said second member; and at least one catch on said first member for engaging the latch on the second member upon receipt of the second member in the first member.

6. The enclosure of claim 5 wherein the first member is a parallelepiped having generally rectangular sides and ends, each side generally orthogonal to each end.

7. The enclosure of claim 5 wherein the second member is a parallelepiped having generally rectangular sides and ends, each side generally orthogonal to each end.

8. The enclosure of claim 5 wherein the first and second members are fabricated from high density polyethylene.

9. The enclosure of claim 5 wherein each catch comprises a protrusion extending into the channel of the first member.

10. The enclosure of claim 9 wherein each latch comprises a recess on the second member for engaging the catch on the first member.

11. A repair kit for effecting repair of a sheath fault of a cable, comprising a first elongated member having opposite ends, each with an opening in communication with a channel extending in the member along its major axis to receive a damaged portion of the cable to enable the cable to extend through the openings;

a second elongated member having opposite ends, each with an opening in communication with a channel extending in the second member along its major axis to receive a damaged portion of the cable to enable the cable to extend through the openings; the second member of a length shorter than, and having a cross-section of an area smaller than that of the channel of the first member to enable receipt of the second member in the channel of the first member;

at least one latch on said second member;

at least one catch on said first member for engaging the latch on the second member upon receipt of the second member in the first member; and a quantity of non-water-soluble gel for immersing the damaged portion of the cable in the channel in the first member.

12. The kit of claim 11 wherein the first member is a parallelepiped having generally rectangular sides and ends, each side generally orthogonal to each end.

13. The kit of claim 11 wherein the second member is a parallelepiped having generally rectangular sides and ends, each side generally orthogonal to each end.

14. The kit of claim 11 wherein the first and second members are fabricated from high density polyethylene.

15. The kit of claim 11 wherein each catch comprises a protrusion extending into the channel of the first member.

16. The kit of claim 15 wherein each latch comprises a recess on the second member for engaging the catch on the first member.

* * * * *